United States Patent Office 3,018,181
Patented Jan. 23, 1962

3,018,181
GELATIN DESSERT AND METHOD OF
PREPARING THE SAME
Leo D. Corben, Oak Park, and William H. Hatch, Allen
Park, Mich., assignors to The American Agricultural
Chemical Company, New York, N.Y., a corporation
of Delaware
No Drawing. Filed Nov. 6, 1959, Ser. No. 851,265
12 Claims. (Cl. 99—130)

This invention relates to the preparation of gelatin desserts and more particularly to gelatin dessert products and procedure for making gelatin desserts therefrom.

Gelatin dessert products are commonly compositions, in powdered or equivalent finely divided form, which contain gelatin, sugar, fruit acid or the like, buffer, and usually supplemental flavoring material, so constituted that upon dissolving a predetermined quantity of the product in a measured quantity of water, e.g. hot water, the resulting solution will, after chilling for a considerable period of time, gel to a consistency desired for a so-called gelatin or jelly-like dessert. A presently preferred practice with compositions of this type has been to incorporate the measured quantity of the product first into an amount of hot or boiling water equal to one-half of the total amount of water required for the ultimate comestible. With the powdered composition dissolved thus in the hot water, cold water is then added in the remaining amount of the above-mentioned total requirement and the thus partially cooled solution, in an appropriate vessel or vessels, is allowed to rest in a region of low temperature such as an ordinary refrigerator, whereupon it sets to the desired soft jelly-like consistency, usually requiring several hours, or under the very best circumstances, at least one hour or more, in order to achieve its finished state.

Various efforts have been made to reduce the time required for gelation of these dessert compositions, as by using specially prepared or converted gelatins which are more or less soluble in cold water, or by including special ingredients such as so-called degraded gelatin, but in general such modifications have involved a disproportionate increase in the cost of the product or have been objectionable in other respects. A further problem, moreover, in attempts to shorten the gelling time of these products has resided in the fact that the ultimately prepared dessert must have a certain gel consistency and must be able to keep that consistency over a considerable period of time. In particular, the ultimate material should be of a desirable texture; if it is stiff or tough, or tends to become so upon standing for a number of hours under chilling conditions, it is regarded as highly inferior and the powdered product from which it is made is generally unsaleable.

It is, accordingly, an object of the present invention to provide an improved composition which will have a faster setting or gelling time than products heretofore available, yet without addition of special, costly ingredients, and with proper attainment and maintenance of the desired soft consistency in the gelled dessert. A further object is to provide an improved composition which will afford a greatly reduced setting time and which will also yield a substantially larger amount of the ultimate prepared dessert from a given quantity of the powdered composition. Another object is the attainment of these ends while providing full flavor and other characteristics in the material and while permitting use of simple operations in making up the dessert.

An additional object of the invention is the provision of an improved procedure for making gelatin desserts, with respect to the employment and treatment of the material, whereby an extremely rapid gel or set is obtained, yielding a substantially larger amount of dessert from a given quantity of material than was heretofore conventionally possible, all with full realization of desired consistency and flavor.

By way of example, commercial gelatin dessert products are now commonly distributed in packages containing approximately three ounces (or 85 grams) of the material, these being designed for ultimate solution in a quantity of water equal to 16 fluid ounces, or two cups (by conventional household measure), one usual operation being to mix the stated amount of product with one cup (8 ounces) of hot water, and then after complete solution, to add one cup of cold water. The complete mixture is then subjected to refrigeration to achieve the desired gel, over a period of more than one hour and often of several hours. A particular feature of the present invention resides in the provision of a new product, i.e. a dessert composition which when taken, for instance, in the same conventional amount, i.e. 3 ounces, is useful for preparation of a substantially larger quantity of the ultimate dessert while achieving gelation to the desired final state in a much shorter time, i.e. not more than half the time found necessary with conventional compositions. It may be explained that for comparison and other purposes herein, the attainment of desired gelation has been determined as the time when the material, in a suitable vessel, has gelled to the point where it will not fall out upon inverting the vessel.

To these and other ends, the new composition involves a combination of ingredients which is novel with respect to certain ingredient properties, proportions and other characteristics, as distinguished from conventional preparations. Specifically, in a composition which consists essntially of gelatin, sugar or sugars, acid, and minor amounts of buffer and flavoring material, the novel results are achieved by the inclusion of gelatin in amount ranging from about 12% to about 15% of the total product (by weight), such gelatin having a Bloom value in the range of 220 to 240, or perhaps somewhat higher, e.g. 250, and the acid and buffer content of the mixture being such as to provide a pH of 3.0 to 4.0 when dissolved, special advantage being attained in certain respects with a pH in the upper part of such range, e.g. upwards of 3.5. The product is made up as a dry powder consisting of a uniform admixture of the ingredients.

In preparing dessert from this composition in accordance with the new and preferred procedure of the invention, the total amount of water employed is approximately 20 fluid ounces for 3 ounces by weight of the powder, and the operation involves first dissolving the material in hot water in amount of two-fifths of the total to be used, then adding the remaining three-fifths as cold water. So constituted and prepared, the dessert can be fully gelled, as at ordinary refrigerator temperatures, in a remarkably short time, e.g. in its preferred forms in as little as one-half hour from the completion of the solution. The result is a full-flavored dessert, of the desired jelly character, which is highly satisfactory and which does not become tough or objectionably stiff after protracted standing under chilling conditions, e.g. even for twelve to twenty-four hours or longer.

In contrast to the new composition, present commercial dessert products generally involve a gelatin content of the order of 10% to 11% or 11.5%, employing gelatin having a Bloom value of about 200 or somewhat less, as in the range of 180 to 200 or 210. These compositions are conventionally buffered to achieve a pH of 3.0 to 3.5 in solution, and as explained, are ordinarily used in proportion of 3 ounces by weight to 16 fluid ounces of water, so circumstanced as to require setting times upwards of one hour, often considerably more than one hour. It has heretofore been believed that the use of larger proportions of gelatin in products composed and employed in accordance with prior conventional practice will yield ultimate dessert material which develops gel strength to an undesirable level, i.e. imparting a tough and rubbery texture to the material, while at best effecting only a very minor improvement in setting time. Indeed such has been in fact the experience, to the extent that any increase of the gelatin content with the view of shortening gelation time, has been regarded as highly objectionable.

Similar belief and experience has been had with respect to the use of gelatin having a higher Bloom value in conventional dessert compositions as employed in the ordinary way, described above. That is to say, the ultimate product has been regarded as becoming too stiff or tough, and in point of fact any decrease in setting time has been relatively slight.

With the composition and practice of the present invention, however, a surprisingly large reduction of gelling time has been achieved without adverse effect on the consistency of the gelled dessert; it does not exhibit a stiff or tough character, or acquire such character on storage as might have been expected in the light of the prior experience or understanding of the art. The shortness of setting time required is notably unusual, and especially so with the attainment of an acceptable jelly in the final product. For example, whereas an increase of gelatin proportion in the conventional composition has been found to toughen the prepared dessert when employing the ordinary amount of water, the use of a larger quantity of water under such circumstances, in order to avoid such stiffening, provides a situation of essentially no improvement, i.e. in that the setting time is just as long as where conventional gelatin proportions and amounts of water are employed.

By way of preliminary example, a greatly preferred gelatin formulation according to the present invention consists essentially of gelatin 12% to 14% (by weight), sugar or sugars about 82%, citric acid about 2.5%, sodium citrate (as buffer) about 0.6%, with flavoring and color as desired, in total amount usually less than 0.5%, the quantity of sugar being adjusted to equate the sum of the ingredient proportions to 100%, as necessary. The buffer and citric acid are preferably adjusted, in exact amount, to yield a pH in the final dessert solution of, say, 3.3 to 3.8, but very preferably 3.6 to 3.8. When dessert material is prepared from this composition by the procedure described above, e.g. dissolving 3 ounces of the product in 8 fluid ounces of hot water and then adding 12 fluid ounces of cold water, gelling is completed in a remarkably short time of standing under refrigeration, i.e. in many cases as little as one-half hour.

The reason for the attainment of these remarkable results is not fully understood, inasmuch as the individual aspects of difference of the invention with respect to standard or conventional practice would not alone or even additively be expected to yield an improvement of this order, and indeed in the case of a change in gelatin proportion or in Bloom value would have been regarded as objectionable, i.e. in stiffening or toughening the ultimate dessert. It is at present believed, however, that an unusual combination of effects contributes, in part, to the new results of the invention. For example, the higher Bloom gelatin has an advantageously higher setting temperature (thus requiring somewhat less chilling to gel it), while the new procedure of following the hot water solution with addition of a substantially larger quantity of cold water provides an initially lower temperature of the complete solution. In this way such solution, as formed, has a temperature very much closer to the setting temperature of the gelatin present, than in prior practice.

At the same time, moreover, all of these results are achieved with the yield of a larger quantity of dessert product from the same weight of powdered composition. While the mere production of a larger volume of gelled material might be obvious from the use of more gelatin and more water, the combined effect of these and other changes which characterize the present composition and procedure is much greater and is distinctly different. For example, the additional cold water has the previously described function of contributing to a far closer approach of the initial solution temperature to the gelatin setting temperature, and furthermore, the entire combination of new features has the remarkable result of avoiding any undue stiffening or toughening (either initially or later), contrary to what might have been expected. It is especially noteworthy, too, that the ultimate dessert prepared in accordance with the invention is entirely satisfactory, being fully equal to the best products of prior practice, as to flavor, quality, body, consistency and the like.

The critically effective proportions and characteristics of the powdered product are also predicated on or related to certain further, new discoveries. In the first place, whereas it had heretofore been thought that the setting time and stiffness of a gel, as usually prepared from conventional compositions, would change respectively in inverse and direct proportions of a continuing linear character, relative to the percentage of gelatin present, it has now been found that although the setting time decreases with increase of gelatin content from say 11% to 14%, further increase of gelatin percentage has no effect on setting time until the amount of gelatin exceeds about 17%. Thus a plot of setting time against percentage of gelatin in the powdered product, shows a downward slope to the 14% gelatin value, and then a plateau to the 17% value. In consequence a special feature of the present invention, important for economy of manufacture, is the use of a gelatin content in the range of 12% to 14%, although as indicated above, the invention can be deemed as extending to a value of about 15% in its broader aspect.

A further discovery, with respect to the improved compositions here disclosed, is that no substantially faster set is achieved by the use of gelatin of a higher Bloom value than about 240. While the invention can, in a broader sense, be deemed to embrace products using gelatin having a Bloom up to about 250, a most economical aspect of the invention thus resides in the utilization of gelatin at 220 to 240 Bloom. The reason for absence of faster set in the present new composition, when gelatins having a Bloom value substantially above 240 are used, is not known, although it may be that the spacing of the gelatin molecules by the sugar in the mixture prevents realization of any further decrease in setting time as the Bloom value is further raised. In any event, the critical significance of the Bloom values contemplated in the present invention is emphasized by the discovery which has just been described.

According to present experience, the gelatin employed for the new product may be any of the types commonly known and available for food use, e.g. either as derived from lime-treated gelatin raw material or from acid-treated raw material, it being understood that the lime process and the acid process are the two general kinds of operations used for making gelatin, depending upon the type of raw material employed. The production of gelatin having various Bloom values, as through the ranges herein contemplated, is well understood and therefore no explanation is needed as to the manufacture of gelatin having the specified characteristics. Procedures for measuring Bloom value of a gelatin have been fully and precisely established, the values mentioned herein being as determined by the specifications of the Technical Committee of the Gelatin Manufacturers Institute of America, using the so-called beveled edge button. It will be appreciated that such determinations embrace the preparation of a gelatin solution of standard concentration and its gelation under standard conditions, whereupon the Bloom value is measured by the weight necessary to depress a plunger or button through a predetermined small distance inward of a free horizontal surface of the gel.

The other ingredients of the present compositions are in general such as conventionally employed for these dessert products. The major ingredient is sugar material, in the range of about 80% to about 85% of the total composition, the term sugar material being herein used to mean one or more sugars, as of types commonly employed in dessert products, e.g. sucrose, dextrose, levulose, maltose or the like. While for some purposes the sugar material may consist entirely of sucrose (as cane sugar), it is at present preferred to utilize a mixture of sucrose and dextrose, e.g. as in the examples below.

The composition also includes a certain amount of acid which conventionally is a so-called fruit acid, and may ordinarily consist simply of citric acid. In general, this ingredient may range from 2% to 3% of the product, with variation depending on the tartness or flavor, and likewise the pH, desired. A buffer salt, as of the class of phosphates and citrates, is included, for maintenance or regulation of the necessary pH, i.e. in the range of about 3.0 to about 4.0. The pH is, of course, that of the ultimate solution or dessert. In general, lower setting times are obtained with pH values in the higher part of the stated range, but taste preference may often dictate a pH at the middle or lower part of the range. Exceptionally satisfactory results have been obtained with a pH of 3.7 to 3.8. An effective buffer salt is sodium citrate, used in an amount as needed, usually about 0.6%. Major variations of pH, of course, within the stated range are achieved by variation in the amount of acid.

Finally, minor quantities of flavoring and coloring materials can be included, to provide such specific flavor and appearance as may be desired. These ingredients, usually in total representing much less than 1% of the entire composition, are wholly conventional and as they have no effect on the gelling or other properties of the mixture, need not be discussed in detail. The complete product, as a dry powdered material, is produced in conventional manner, e.g. by appropriate grinding and mixing of the selected ingredients, as will be readily understood.

The following are specific examples of compositions embodying the invention, it being appreciated that in each case suitable flavoring, and suitable coloring dye, may be added. The amounts stated are those necessary to provide 85 grams or approximately 3 ounces, of the product mixture, such being the quantity which is commercially packaged and sold, in present practice with conventional compositions, as suitable for making up a single batch of gelatin dessert.

*Example I*

| | |
|---|---|
| Gelatin (220 Bloom) | 11.00 g. to 11.85 g. |
| Sugar (sucrose) | 54.35 g. to 53.50 g. |
| Dextrose | 16.60 g. |
| Citric acid | amount to bring pH to range 3.0–4.0. |
| Sodium citrate | 0.59 g. |

*Example II*

| | |
|---|---|
| Gelatin (230 Bloom) | 10.58 g. to 11.43 g. |
| Sugar (sucrose) | 54.77 g. to 53.92 g. |
| Dextrose | 16.60 g. |
| Citric acid | amount to bring pH to range 3.0–4.0. |
| Sodium citrate | 0.59 g. |

*Example III*

| | |
|---|---|
| Gelatin (240 Bloom) | 10.20 g. to 11.00 g. |
| Sugar (sucrose) | 55.15 g. to 54.35 g. |
| Dextrose | 16.60 g. |
| Citric acid | amount to bring pH to range 3.0–4.0. |
| Sodium citrate | 0.59 g. |

It will be understood that in general, in selecting the ingredients for these compositions, the nature and quantity of the gelatin may conveniently first be determined, optimum results as to setting time being achieved at the upper end of the preferred ranges of gelatin proportion and Bloom value. The quantity of citric acid, usually about 2.5% (or 2.12 grams in the above preparations) is chosen for the desired pH value, having regard both to setting time and flavor, and the sodium citrate or equivalent buffer is included in suitable amount for the buffering function. Except for the very small proportions of flavor or dye, the remainder of the product is essentially sugar, for instance a mixture of sucrose and dextrose, such as in the above examples; thus conveniently, the quantity of sugar can be varied, without great effect, as may be necessary to achieve the desired total quantity of product containing the selected percentage of gelatin content.

By way of illustration of the results obtainable, compositions made according to the above examples were tested for the preparation of desserts, pursuant to the preferred procedure of the invention. That is to say, 85 grams of each composition was dissolved in 8 fluid ounces (one cup) of hot water, e.g. water at 70° C. This effected complete solution of the powder. Thereupon one and one-half cups (12 fluid ounces) of cold water, e.g. at 10° C. were added, and the complete solution, in one or more suitable vessels, was placed in a refrigerator at 40° F. As stated above, the dessert was considered set when the vessel or container could be inverted without having the contents drop out. For comparison, 85 gram amounts of commercial dessert compositions were made up into desserts in accordance with conventional instructions, namely by dissolving such composition in one cup of hot water, followed by one cup of cold water, i.e. at the same temperatures as specified above. The solutions were then placed to chill under refrigeration in the same way.

It was found that in all cases, the desserts prepared from the new compositions were effectively set in approximately one-half the time required for the commercial preparations. Indeed, whereas the commercial preparations required an hour or more often longer under the stated conditions, the new products usually yielded finished desserts in not more than about one-half hour. The improved results were thus fully demonstrated, it being further found that the gelled material from the present products had a desirably soft character, i.e. was neither unduly stiff nor tough (being equal to the best of commercial preparations now available). Furthermore, when the gelled desserts, as made from the above examples, were allowed to remain in refrigerated condition for a long time, even up to 24 hours, there was no undue stiffening or toughening.

Unless otherwise specified, the terms "hot water" and "cold water" are used herein to mean water respectively having temperatures not lower than about 60° C. and not higher than about 20° C. Where employed in descriptions of the ingredients of the product, the term "acidifying material" is defined as consisting of acid which is suitable, and such buffer as may be necessary, to provide the desired characteristics of acidity when the composition is dissolved.

It is to be understood that the invention is not limited to the specific proportions and operations herein described, but may be carried out in other ways without departure from its spirit.

We claim:

1. A gelatin dessert product consisting essentially of gelatin, sugar material and acidifying material, the gelatin content of the product being from 12% to 15% by weight and consisting of gelatin having a Bloom value of 220 to 250.

2. A gelatin dessert product consisting essentially of gelatin, sugar material and acidifying material, and having a pH of about 3.0 to 4.0 when dissolved, the gelatin content of the product being from 12% to 14% by weight and consisting of gelatin having a Bloom value of 220 to 240.

3. A gelatin dessert product consisting essentially of 12% to 15% by weight of gelatin having a Bloom value of 220 to 250, 80% to 85% by weight of sugar material, and citric acid and buffer salt to provide a pH of about 3.0 to 4.0 when the product is dissolved.

4. A gelatin dessert product as defined in claim 3, which includes supplemental flavoring and coloring material, and wherein the acid and buffer salt are proportioned to provide a pH of 3.3 to 3.8.

5. A gelatin dessert product adapted to gel to a desired dessert consistency after incorporation in hot water and addition of cold water, said hot water and cold water being in the ratio of 2:3 in amount, said product comprising 12% to 15% by weight of gelatin having a Bloom value of 220 to 250, the balance of the product consisting essentially of sugar material, fruit acid and buffer salt, said product having a pH of about 3.0 to 4.0 when dissolved.

6. A gelatin dessert product adapted to gel to a desired dessert consistency after incorporation in hot water and addition of cold water, said hot water and cold water being in the ratio of 2:3 in amount, comprising 12% to 14% by weight of gelatin having a Bloom value of 220 to 240, the balance of the composition consisting essentially of sugar material, citric acid and citrate buffer, said composition having a pH of about 3.0 to 4.0 when dissolved.

7. A gelatin dessert product as defined in claim 6, in which the acid and buffer are present in amounts and mutual proportions to provide a pH of 3.6 to 3.8.

8. A method of preparing a gelatin dessert comprising dissolving in hot water a mixture consisting essentially of 12% to 15% by weight of gelatin having a Bloom value of 220 to 250, sugar material, and acidifying material, said hot water being employed in the proportion of about 8 fluid ounces to about 3 ounces by weight of the mixture, then diluting the hot water solution with cold water in amount about 50% greater than the volume of hot water, and gelling the final diluted solution.

9. A method of preparing a gelatin dessert comprising dissolving in hot water a mixture consisting essentially of 12% to 15% by weight of gelatin having a Bloom value of 220 to 250, sugar material, and fruit acid and buffer salt to provide a pH of the final solution of about 3.0 to 4.0, said hot water being employed in the proportion of about 8 fluid ounces to about 3 ounces by weight of the mixture, then diluting the hot water solution with cold water in amount about 50% greater than the volume of hot water, and chilling the final diluted solution to gel it.

10. A method of preparing a gelatin dessert comprising dissolving in hot water having a temperature of at least about 70° C., a mixture consisting essentially of 12% to 14% by weight of gelatin having a Bloom value of 220 to 240, 80% to 85% by weight of sugar material, and citric acid and citrate buffer in amount to provide a pH of the final solution of 3.3 to 3.8, said hot water being employed in the proportion of about 8 fluid ounces to about 3 ounces by weight of the mixture, then diluting the hot water solution with cold water at a temperature not higher than about 10° C., in amount about 50% greater than the volume of hot water, and chilling the final diluted solution to gel it.

11. A gelatin dessert consisting essentially of a gelled aqueous solution of solid ingredients, in the proportion of about 3 ounces by weight of said solid ingredients to about 20 fluid ounces of water, said solid ingredients consisting essentially of 12% to 15% by weight of gelatin having a Bloom value of 200 to 250, sugar material, and acidifying material to provide a pH of about 3.0 to 4.0.

12. A gelatin dessert consisting essentially of a gelled aqueous solution of solid ingredients, in the proportion of about 3 ounces by weight of said solid ingredients to about 20 fluid ounces of water, said solid ingredients consisting essentially of 12% to 15% by weight of gelatin having a Bloom value of 230 to 250, 80% to 85% by weight of sugar material, and citric acid and buffer salt to provide a pH of 3.3 to 4.8.

References Cited in the file of this patent

UNITED STATES PATENTS

| | | |
|---|---|---|
| 2,412,305 | Stokes et al. | Dec. 10, 1946 |
| 2,557,871 | Harnack et al. | June 19, 1951 |

OTHER REFERENCES

"The Boston Cooking-School Cook Book" by Fannie Farmer, ninth edition, Little, Brown and Company, Boston, page 489.